(12) United States Patent
Tanaka (10) Patent No.: US 12,536,268 B2
(45) Date of Patent: Jan. 27, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Tatsuyuki Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 546 days.

(21) Appl. No.: 17/579,596

(22) Filed: Jan. 20, 2022

(65) Prior Publication Data

US 2023/0070466 A1    Mar. 9, 2023

(30) Foreign Application Priority Data

Sep. 7, 2021    (JP) .................................. 2021-145673

(51) Int. Cl.
G06F 21/45    (2013.01)

(52) U.S. Cl.
CPC ...... G06F 21/45 (2013.01); *G06F 2221/2111* (2013.01)

(58) Field of Classification Search
CPC ... G06F 21/45; G06F 21/44; G06F 2221/2111
See application file for complete search history.

(56) References Cited

U.S. PATENT DOCUMENTS

| 7,965,401 | B2 * | 6/2011 | Ishimaru | H04N 1/00933 |
| | | | | 358/1.14 |
| 8,570,566 | B2 * | 10/2013 | St. Laurent | H04L 67/51 |
| | | | | 358/440 |
| 12,127,249 | B2 * | 10/2024 | Li | H04W 74/0808 |
| 2009/0051956 | A1 | 2/2009 | Kondo | |
| 2009/0231619 | A1 * | 9/2009 | Takahashi | G06F 21/608 |
| | | | | 358/1.15 |

(Continued)

FOREIGN PATENT DOCUMENTS

| JP | 2009055243 | 3/2009 |
| JP | 2015143958 | 8/2015 |

(Continued)

OTHER PUBLICATIONS

"Search Report of Europe Counterpart Application", issued on Sep. 29, 2022, pp. 1-7.

(Continued)

*Primary Examiner* — Dao Q Ho
(74) *Attorney, Agent, or Firm* — JCIPRNET (57) ABSTRACT

An information processing apparatus includes a processor configured to: acquire position information of a user in a case where the user is successful in authentication of a system including the information processing apparatus and requests to use the information processing apparatus; and request a management device, which manages a user who is capable of using the information processing apparatus, to allow the user to use the information processing apparatus even though a use of the information processing apparatus is not allowed in advance in a case where the user is present in a predetermined range from the information processing apparatus.

20 Claims, 7 Drawing Sheets

(56) References Cited

U.S. PATENT DOCUMENTS

| | | | | |
|---|---|---|---|---|
| 2009/0284790 | A1* | 11/2009 | Ohashi | H04N 1/00204 |
| | | | | 358/1.15 |
| 2012/0293819 | A1* | 11/2012 | Doui | H04L 63/083 |
| | | | | 358/1.13 |
| 2016/0316080 | A1* | 10/2016 | Shimamoto | H04N 1/00832 |
| 2018/0068110 | A1* | 3/2018 | Watanabe | G06F 21/32 |
| 2018/0357406 | A1* | 12/2018 | Bolotin | H04L 9/002 |
| 2020/0228943 | A1* | 7/2020 | Martin | G01S 13/767 |
| 2021/0029546 | A1* | 1/2021 | Maufort | G06F 21/608 |
| 2021/0149610 | A1 | 5/2021 | Deguchi | |
| 2021/0200484 | A1* | 7/2021 | Mohammad | G06F 3/1203 |

FOREIGN PATENT DOCUMENTS

| | | |
|---|---|---|
| JP | 2016175248 | 10/2016 |
| JP | 2021081837 | 5/2021 |

OTHER PUBLICATIONS

"Office Action of Japan Counterpart Application", issued on Jun. 17, 2025, with English translation thereof, pp. 1-9.
"Notice of Reasons for Refusal of Japan Counterpart Application", issued on Oct. 21, 2025, with English translation thereof, pp. 1-11.

\* cited by examiner

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2021-145673 filed Sep. 7, 2021.

BACKGROUND

(i) Technical Field

The present invention relates to an information processing apparatus, a non-transitory computer readable medium storing an information processing program, and an information processing method.

(ii) Related Art

JP2016-175248A discloses an image forming apparatus. The image forming apparatus includes a first information receiving unit that receives first information which is the identification information of a user in a system provided in a specific organization including an image forming apparatus for performing first authentication, and a second information receiving unit that receives second information which is the identification information of the user in a service system on a cloud for performing second authentication. Further, the image forming apparatus includes an association storage unit that associates and stores the first information and the second information, and a use registration unit that registers the second information in the service system as the identification information of a user who uses the image forming apparatus using the identification information of the image forming apparatus in the service system. Furthermore, the image forming apparatus includes an acquisition unit that acquires print data including the second information from the service system, and a control unit that controls processing for printing the print data acquired by the acquisition unit using the first information stored in the association storage unit in association with the second information included in the acquired print data.

SUMMARY

In a case where a user is successful in the authentication of the system, the user can use an apparatus included in the system even without the allowance of the administrator of the apparatus. Accordingly, in a case where the user is to cause the apparatus, which is present in a predetermined range from the user, to execute processing and the user makes a mistake in selection, an undesired apparatus may be caused to execute processing.

Aspects of non-limiting embodiments of the present disclosure relate to an information processing apparatus, a non-transitory computer readable medium storing an information processing program, and an information processing method that can prevent an undesired apparatus from being caused to execute processing even though a user makes a mistake in selection in a case where the user is to cause an apparatus, which is present in a predetermined range from the user, to execute the processing.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: acquire position information of a user in a case where the user is successful in authentication of a system including the information processing apparatus and requests to use the information processing apparatus; and request a management device, which manages a user who is capable of using the information processing apparatus, to allow the user to use the information processing apparatus even though a use of the information processing apparatus is not allowed in advance in a case where the user is present in a predetermined range from the information processing apparatus.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment of the present disclosure will be described with reference to the drawings. In the respective drawings, the same or equivalent components and portions will be denoted by the same reference numerals. Further, since the scales of the drawings are exaggerated for convenience of description, there is a case where the scales are different from actual scales.

Figure 1:
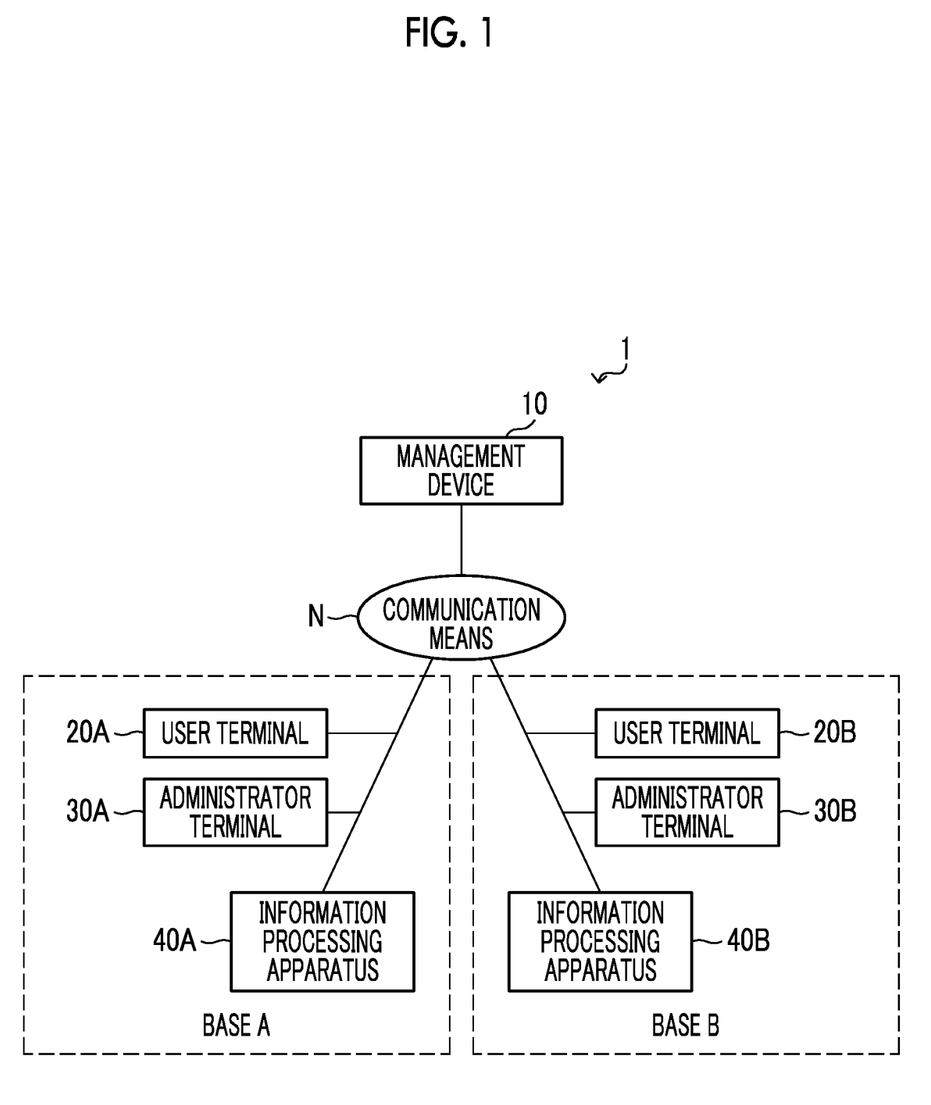
FIG. 1 is a schematic diagram showing an example of the hardware configuration of an information processing system according to an exemplary embodiment.

As shown in FIG. 1, an information processing system 1 according to the present exemplary embodiment includes: a management device 10; a user terminal 20A, an administrator terminal 30A, and an information processing apparatus 40A that are provided at a base A; and a user terminal 20B, an administrator terminal 30B, and an information processing apparatus 40B that are provided at a base B.

Hereinafter, in a case where the respective user terminals 20A and 20B are described without being distinguished from each other, the respective user terminals 20A and 20B are referred to as "user terminals 20". Further, in a case where the respective administrator terminals 30A and 30B are described without being distinguished from each other, the respective administrator terminals 30A and 30B are referred to as "administrator terminals 30". Furthermore, in a case where the respective information processing apparatuses 40A and 40B are described without being distinguished from each other, the respective information processing apparatuses 40A and 40B are referred to as "information processing apparatuses 40". The numbers of the bases, the user terminals 20, the administrator terminals 30, and the information processing apparatuses 40 are not limited to an example shown in FIG. 1.

The management device 10, the user terminals 20, the administrator terminals 30, and the information processing apparatuses 40 are adapted to communicate with each other via communication means N. An intra-company communication line, such as a local area network (LAN) or a wide area network (WAN) is applied as the communication means N in the present exemplary embodiment. However, as the communication means N, a public communication line, such as an internet or a telephone line, may be applied or an intra-company communication line and a public communication line may be applied in combination. Further, a wireless communication line is applied as the communication means N in the present exemplary embodiment. However, as the communication means N, a wired communication line may be applied or a wired communication line and a wireless communication line may be applied in combination.

The management device 10 is a cloud server providing a user management service, which is used to manage a user who can use the information processing apparatus 40 installed at each base, and a device management service, which is used to manage the information processing apparatus 40, as cloud services. In the present exemplary embodiment, the device management service includes logic printers that are associated with the information processing apparatuses 40 to be described later, respectively. A server that does not provide a cloud service and the like may be applied as the management device 10.

The user terminal 20 is an information processing terminal of a user who uses the information processing apparatus 40. In the present exemplary embodiment, a personal computer is applied as the user terminal 20. A smartphone, a tablet terminal, or the like may be applied as the user terminal 20.

The administrator terminal 30 is an information processing terminal of an administrator who manages the information processing apparatus 40 provided at the same base as the administrator terminal 30. In the present exemplary embodiment, a personal computer is applied as the administrator terminal 30. A smartphone, a tablet terminal, or the like may be applied as the administrator terminal 30.

The information processing apparatus 40 is an image forming apparatus that is connected to the management device 10 via a network. The logic printer associated with this image forming apparatus is managed by the device management service of the management device 10. Accordingly, in a case where a user selects this logic printer, instructs document data to be printed to perform print settings, and instructs the logic printer to perform printing, print data generated by the logic printer is acquired and image forming processing is performed. In the present exemplary embodiment, an information forming apparatus executing functions, such as a print function, a copy function, a scan function, and a facsimile function, is applied as the information processing apparatus 40. Any information processing apparatus may be applied as the information processing apparatus 40. For example, a personal computer, a smartphone, or the like may be applied as the information processing apparatus 40.

Next, the configuration of the management device 10 will be described with reference to FIG. 2.

Figure 2:
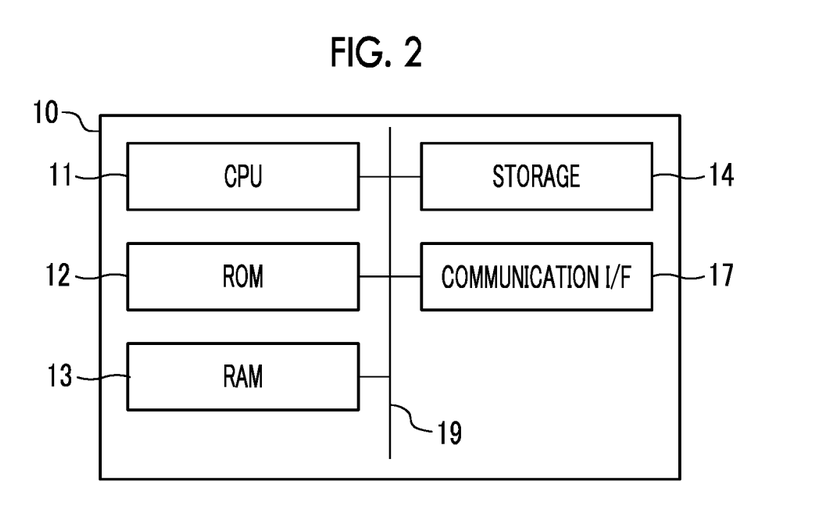
FIG. 2 is a block diagram showing an example of the hardware configuration of a management device according to the exemplary embodiment.

As shown in FIG. 2, the management device 10 includes components, such as a central processing unit (CPU) 11, a read only memory (ROM) 12, a random access memory (RAM) 13, a storage 14, and a communication interface (I/F) 17. The respective components are connected to each other via a bus 19 to be capable of communicating with each other.

The CPU 11 is a central processing unit, and executes various programs or controls each part. That is, the CPU 11 reads out programs from the ROM 12 or the storage 14 and executes the programs using the RAM 13 as a work area. The CPU 11 controls the respective components and performs various types of arithmetic processing according to the programs recorded in the ROM 12 or the storage 14. In the present exemplary embodiment, a user management program for providing the user management service and a device management program for providing the device management service are stored in the ROM 12 or the storage 14.

The ROM 12 stores various programs and various data. The RAM 13 temporarily stores programs or data as a work area. The storage 14 is formed of a hard disk drive (HDD) or a solid state drive (SSD), and stores various programs including an operating system and various data. An identification information group of users who can use the information processing system 1, an identification information group of users who can use the information processing apparatus 40 of each base, and the like are stored in the storage 14. In the present exemplary embodiment, the email address of the user terminal 20 is applied as the identification information. However, the identification information is not limited to this example. For example, the employee identification number or the like of a user may be applied as the identification information.

The communication I/F 17 is an interface that is used to communicate with other devices, such as the information processing apparatuses 40. For example, standards, such as Ethernet (registered trademark), FDDI, and Wi-Fi (registered trademark), are used as the communication I/F 17.

Next, the configuration of the user terminal 20 will be described with reference to FIG. 3.

Figure 3:
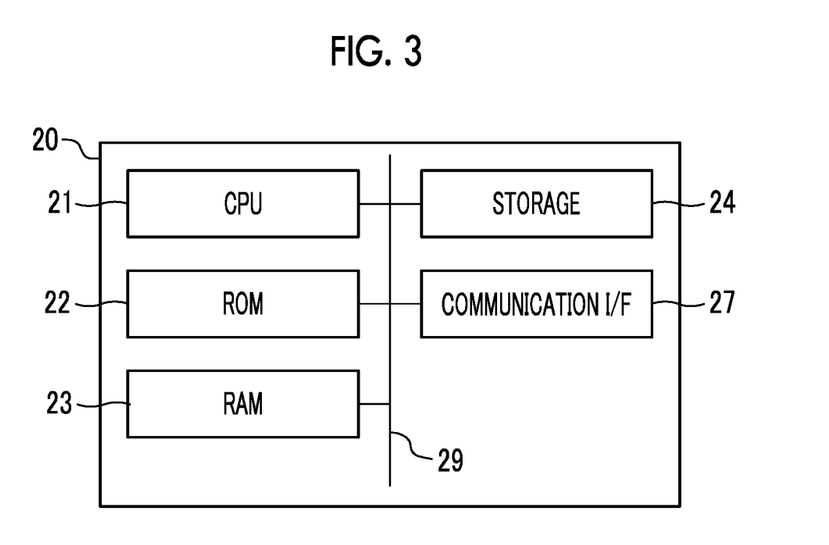
FIG. 3 is a block diagram showing an example of the hardware configuration of a user terminal according to the exemplary embodiment.

As shown in FIG. 3, the user terminal 20 includes components, such as a CPU 21, a ROM 22, a RAM 23, a storage 24, and a communication I/F 27. The respective components are connected to each other via a bus 29 to be capable of communicating with each other.

The CPU 21 is a central processing unit, and executes various programs or controls each part. That is, the CPU 21 reads out programs from the ROM 22 or the storage 24 and executes the programs using the RAM 23 as a work area. The CPU 21 controls the respective components and performs various types of arithmetic processing according to the programs recorded in the ROM 22 or the storage 24. In the present exemplary embodiment, a transmission program, which is used to transmit identification information and a request for the use of the information processing apparatus 40 to the information processing apparatus 40, is stored in stored in the ROM 22 or the storage 24.

The ROM 22 stores various programs and various data. The RAM 23 temporarily stores programs or data as a work area. The storage 24 is formed of an HDD or an SSD, and stores various programs including an operating system and various data.

The communication I/F 27 is an interface that is used to communicate with other devices, such as the information processing apparatuses 40. For example, standards, such as Ethernet (registered trademark), FDDI, and Wi-Fi (registered trademark), are used as the communication I/F 27.

Next, the configuration of the administrator terminal 30 will be described with reference to FIG. 4.

Figure 4:
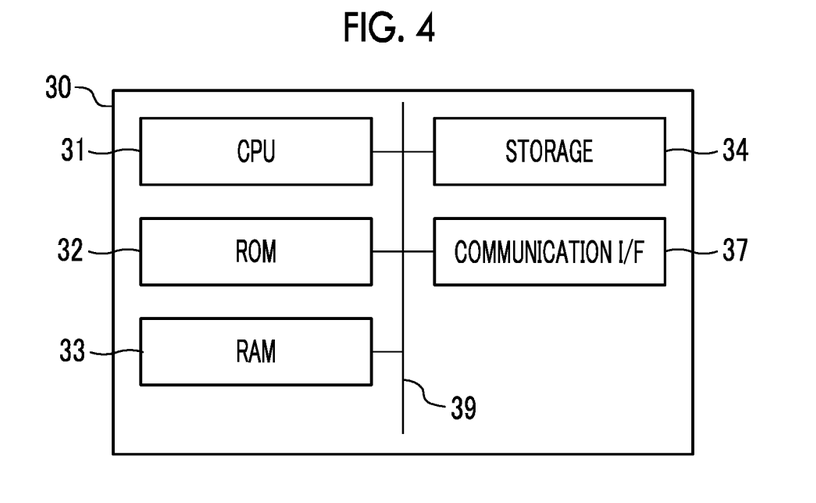
FIG. 4 is a block diagram showing an example of the hardware configuration of an administrator terminal according to the exemplary embodiment.

As shown in FIG. 4, the administrator terminal 30 includes components, such as a CPU 31, a ROM 32, a RAM 33, a storage 34, and a communication I/F 37. The respective components are connected to each other via a bus 39 to be capable of communicating with each other.

The CPU 31 is a central processing unit, and executes various programs or controls each part. That is, the CPU 31 reads out programs from the ROM 32 or the storage 34 and executes the programs using the RAM 33 as a work area. The CPU 31 controls the respective components and performs various types of arithmetic processing according to the programs recorded in the ROM 32 or the storage 34. In the present exemplary embodiment, a deletion instruction program is stored in stored in the ROM 32 or the storage 34. The deletion instruction program is used to transmit an instruction to delete any of identification information from an identification information group of users who can use the information processing apparatus 40 that is stored in the management device 10.

The ROM 32 stores various programs and various data. The RAM 33 temporarily stores programs or data as a work area. The storage 34 is formed of an HDD or an SSD, and stores various programs including an operating system and various data.

The communication I/F 37 is an interface that is used to communicate with other devices, such as the information processing apparatuses 40. For example, standards, such as Ethernet (registered trademark), FDDI, and Wi-Fi (registered trademark), are used as the communication I/F 37.

Next, the configuration of the information processing apparatus 40 will be described with reference to FIG. 5.

Figure 5:
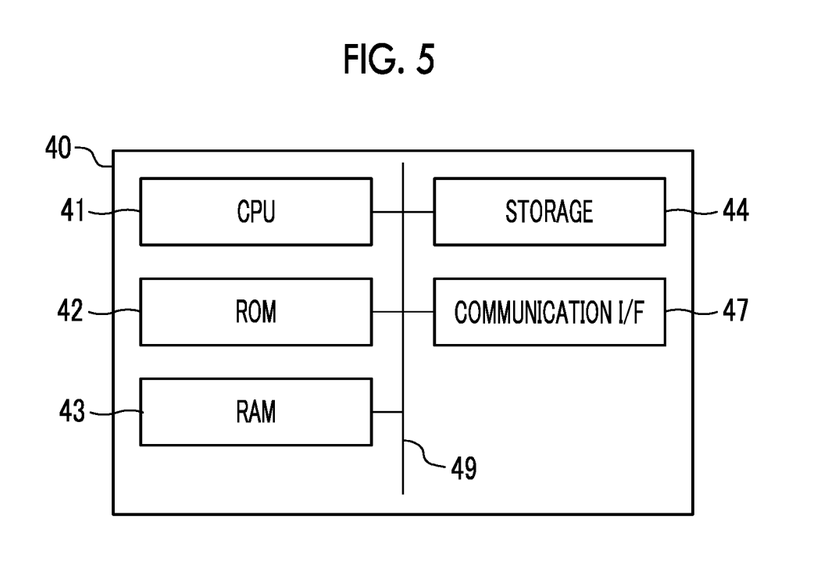
FIG. 5 is a block diagram showing an example of the hardware configuration of an information processing apparatus according to the exemplary embodiment.

As shown in FIG. 5, the information processing apparatus 40 includes components, such as a CPU 41, a ROM 42, a RAM 43, a storage 44, and a communication I/F 47. The respective components are connected to each other via a bus 49 to be capable of communicating with each other.

The CPU 41 is a central processing unit, and executes various programs or controls each part. That is, the CPU 41 reads out programs from the ROM 42 or the storage 44 and executes the programs using the RAM 43 as a work area. The CPU 41 controls the respective components and performs various types of arithmetic processing according to the programs recorded in the ROM 42 or the storage 44. In the present exemplary embodiment, an information processing program for executing information processing, a deletion program for executing deletion processing, and a switching program for executing switching processing, which will be described later, are stored in stored in the ROM 42 or the storage 44.

The ROM 42 stores various programs and various data. The RAM 43 temporarily stores programs or data as a work area. The storage 44 is formed of an HDD or an SSD, and stores various programs including an operating system and various data. The installation location of the information processing apparatus 40, the histories of users who have used the information processing apparatus 40, and the like are stored in the storage 44.

The communication I/F 47 is an interface that is used to communicate with other devices, such as the management device 10, the user terminal 20, and the administrator terminal 30. For example, standards, such as Ethernet (registered trademark), FDDI, and Wi-Fi (registered trademark), are used as the communication I/F 47.

Next, the flow of processing of the information processing system 1 according to the present exemplary embodiment will be described with reference to FIGS. 6A and 6B and FIG. 7. First, information processing for requesting the management device 10 to allow a user of the user terminal 20 to use the information processing apparatus 40 even though the use of the information processing apparatus 40 is not allowed in advance in a case where the user terminal 20 is present in a predetermined range from the information processing apparatus 40 will be described with reference to FIGS. 6A and 6B. In the following description, the owner of the user terminal 20 is simply referred to as "user". Further, in the following description, the information processing apparatus 40 that the user requests to use is simply referred to as "information processing apparatus 40".

Figure 6A:
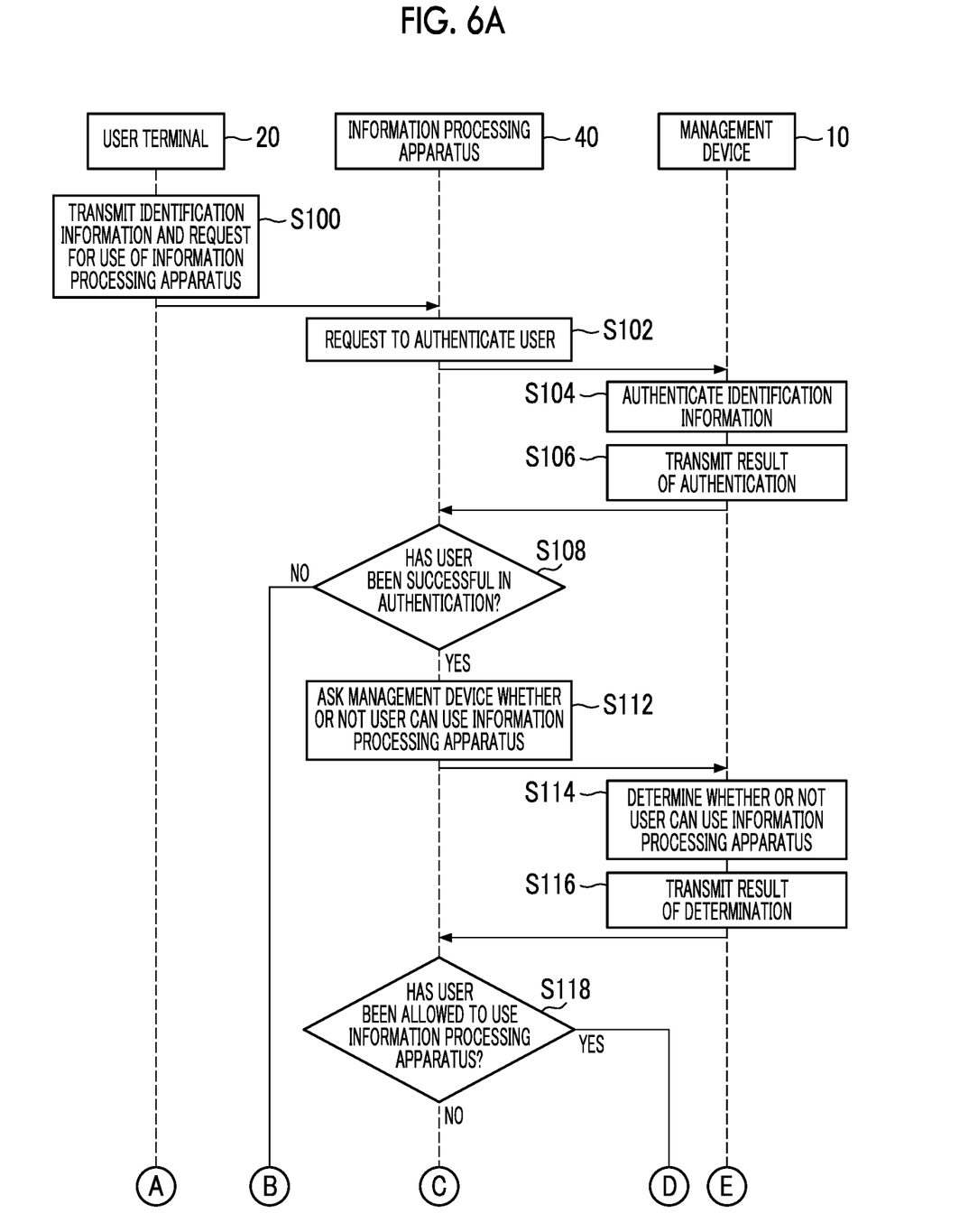
FIGS. 6A and 6B are sequence diagrams showing an example of the flow of information processing of the information processing system according to the exemplary embodiment.
Figure 6B:
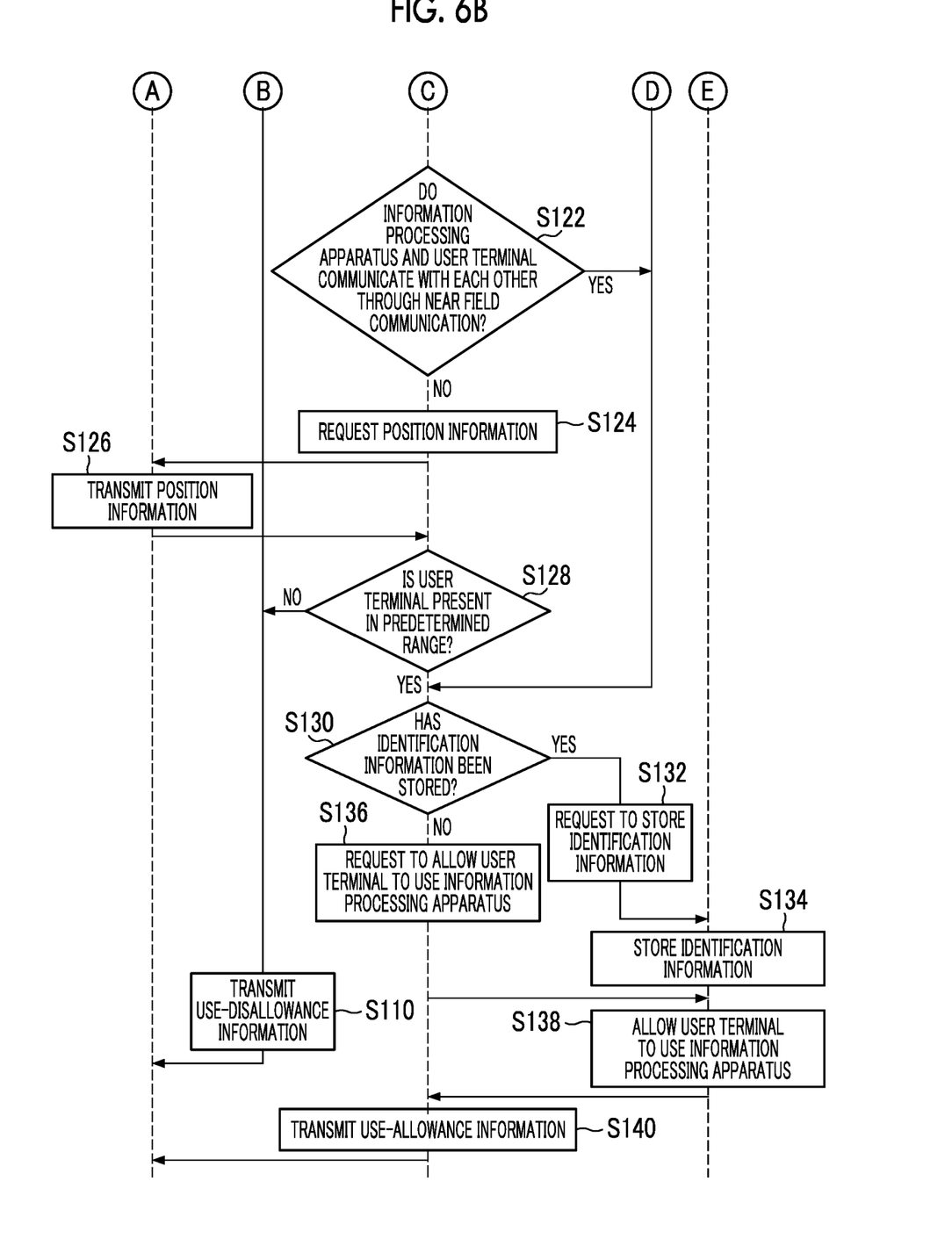
Figure 7:
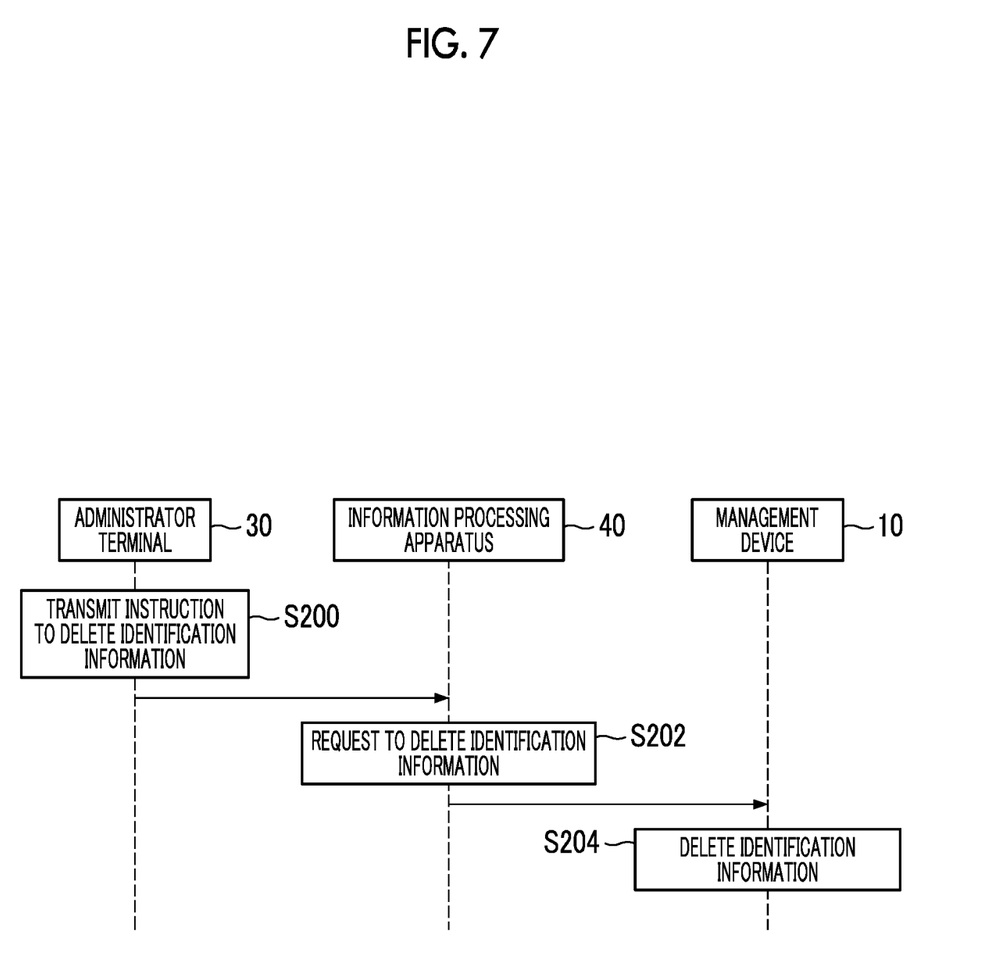
FIG. 7 is a sequence diagram showing an example of the flow of deletion processing of the information processing system according to the exemplary embodiment.

In Step S100 of FIGS. 6A and 6B, the CPU 21 of the user terminal 20 transmits the identification information of a user and a request for the use of the information processing apparatus 40, which are received from the user, to the information processing apparatus 40.

In Step S102, the CPU 41 of the information processing apparatus 40 transmits the identification information of the user and the request for the use of the information processing apparatus 40, which are received from the user terminal 20, to the management device 10 to request the information processing system 1 to authenticate the user.

In Step S104, the CPU 11 of the management device 10 determines whether or not the identification information received from the information processing apparatus 40 is stored in the storage 14 in advance as the identification information of a user who can use the information processing system 1 to execute the authentication of the information processing system 1. Specifically, the CPU 11 determines that the authentication is successful in a case where the received identification information is included in the identification information group of users who can use the information processing system 1 that is stored in advance. On the other hand, the CPU 11 determines that the authentication is failed in a case where the received identification information is not included in the identification information group of users who can use the information processing system 1 that is stored in advance.

In Step S106, the CPU 11 of the management device 10 transmits the result of the authentication executed in Step S104 to the information processing apparatus 40.

In Step S108, the CPU 41 of the information processing apparatus 40 determines whether or not the user has been successful in the authentication of the information processing system 1 from the result of the authentication received from the management device 10. In a case where the user has been successful in the authentication of the information processing system 1 (YES in Step S108), the CPU 41 proceeds to Step S112. On the other hand, in a case where the user has failed in the authentication of the information processing system 1 (NO in Step S108), the CPU 41 proceeds to Step S110.

In Step S110, the CPU 41 of the information processing apparatus 40 transmits use-disallowance information, which shows that the information processing apparatus 40 is not available, to the user terminal 20.

In Step S112, the CPU 41 of the information processing apparatus 40 asks the management device 10 whether or not the user can use the information processing apparatus 40. Specifically, the CPU 41 asks the management device 10 whether or not the user can use the logic printer of the device management service associated with the information processing apparatus 40.

In Step S114, the CPU 11 of the management device 10 determines whether or not the user can use the information processing apparatus 40. Specifically, the CPU 11 determines whether or not the identification information received from the information processing apparatus 40 is stored in the storage 14 in advance as the identification information of a user who can use the information processing apparatus 40. The CPU 11 determines that the use of the information processing apparatus 40 is allowed in a case where the received identification information is included in the identification information group of users who can use the information processing apparatus 40 that is stored in advance. On the other hand, the CPU 11 determines that the use of the information processing apparatus 40 is not allowed in a case where the received identification information is not included in the identification information group of users who can use the information processing apparatus 40 that is stored in advance.

In Step S116, the CPU 11 of the management device 10 transmits the result of the determination of whether or not the user can use the information processing apparatus 40, which has been executed in Step S114, to the information processing apparatus 40.

In Step S118, the CPU 41 of the information processing apparatus 40 determines whether or not the user has been allowed to use the information processing apparatus 40 in advance from the result of the determination that is received from the management device 10. In a case where the user has been allowed to use the information processing apparatus 40 in advance (YES in Step S118), the CPU 41 proceeds to Step S130. On the other hand, in a case where the user has not been allowed to use the information processing apparatus 40 in advance (NO in Step S118), the CPU 41 proceeds to Step S122.

In Step S122, the CPU 41 of the information processing apparatus 40 determines whether or not the identification information of the user has been received from the user terminal 20 in Step S100 through near field communication (for example, NFC, Wi-Fi (registered trademark), Bluetooth (registered trademark), or the like). In a case where the identification information of the user has been received through near field communication (YES in Step S122), the CPU 41 proceeds to Step S130. On the other hand, in a case where the identification information of the user has not been received through near field communication (NO in Step S122), the CPU 41 proceeds to Step S124.

In Step S124, the CPU 41 of the information processing apparatus 40 requests the user terminal 20 to transmit the position information of the user terminal 20. In the present exemplary embodiment, the internet protocol address (IP address) of the user terminal 20 is applied as the position information. This IP address is information that shows position information on a network. However, the position information is not limited to this example. Information about the current position of the user terminal 20 that is acquired in a case where the user terminal 20 receives signals from a GPS satellite, and the like may be applied as the position information.

In Step S126, the CPU 21 of the user terminal 20 transmits the position information of the user terminal 20 to the information processing apparatus 40.

In Step S128, the CPU 41 of the information processing apparatus 40 determines whether or not the user terminal 20 is present in a predetermined range from the information processing apparatus 40 using the position information received through the processing of Step S126. In a case where the user terminal 20 is present in the predetermined range from the information processing apparatus 40 (YES in Step S128), the CPU 41 proceeds to Step S130. On the other hand, in a case where the user terminal 20 is not present in the predetermined range from the information processing apparatus 40 (NO in Step S128), the CPU 41 proceeds to Step S110. Any method may be used as a method of determining whether or not the user terminal 20 is present in the predetermined range from the information processing apparatus 40 by the CPU 41. For example, in a case where the network address part of the IP address of the user terminal 20 is the same as the network address part of the IP address of the information processing apparatus 40, the CPU 41 may determine that the user terminal 20 is present in the predetermined range from the information processing apparatus 40. Further, in a case where GPS information acquired from the user terminal 20 is closer than a predetermined distance from the physical position of the information processing apparatus 40, the CPU 41 may determine that the user terminal 20 is present in the predetermined range from the information processing apparatus 40.

In Step S130, the CPU 41 of the information processing apparatus 40 determines whether or not the identification information received through the processing of Step S100 is included in the identification information group of users who can use the information processing apparatus 40 that is stored in the storage 44 in advance. In a case where the received identification information is included in the identification information group of users who can use the information processing apparatus 40 that is stored in the storage 44 in advance (YES in Step S130), the CPU 41 proceeds to Step S132. In the present exemplary embodiment, the identification information group of users who belong to the same organization as an organization including the information processing apparatus 40 is applied as the identification information group of users who can use the information processing apparatus 40 that is stored in advance. However, the identification information group of users who can use the information processing apparatus 40 is not limited to this example. For example, the identification information group of a user having the same type of a job as a worker working in an organization including the information processing apparatus 40 may be applied as the identification information group stored in advance.

In Step S132, the CPU 41 of the information processing apparatus 40 transmits the identification information, which is received through the processing of Step S100, to the management device 10 and requests the management device 10 to store the identification information in the storage 14 as the identification information group that specifies users who can use the information processing apparatus 40.

In Step S132, the CPU 41 of the information processing apparatus 40 may request the management device 10 to store the identification information of a user as the identification information group that specifies users who can use the information processing apparatus 40 only in a case where the CPU 41 receives an instruction to store the identification information of the user in the management device 10 from the administrator terminal 30. Specifically, in a case where the identification information received through the processing of Step S100 is included in the identification information group of users who can use the information processing apparatus 40 that is stored in the storage 44 in advance (YES in Step S130), the CPU 41 asks the administrator terminal 30 whether or not to store the received identification information through e-mail or the like. Then, in a case where the CPU 41 receives an instruction to store the received identification information from the administrator terminal 30, the CPU 41 may request the management device 10 to store the identification information as the identification information group that specifies users who can use the information processing apparatus 40.

In Step S134, the CPU 11 of the management device 10 stores the identification information, which is received through the processing of Step S132, in the storage 14 as the identification information group that specifies users who can use the information processing apparatus 40. Then, the CPU 11 proceeds to Step S138.

On the other hand, in a case where the CPU 41 of the information processing apparatus 40 determines that the identification information received through the processing of Step S100 is not included in the identification information group of users who can use the information processing apparatus 40 that is stored in the storage 44 in advance (NO in Step S130), the CPU 41 proceeds to Step S136. In Step S136, the CPU 41 of the information processing apparatus 40 requests the management device 10 to allow the user terminal 20 to use the information processing apparatus 40.

In Step S138, the CPU 11 of the management device 10 performs predetermined processing to allow the user terminal 20 to use the information processing apparatus 40, and transmits the fact that the user terminal 20 is allowed to use the information processing apparatus 40 to the information processing apparatus 40.

In Step S140, the CPU 41 of the information processing apparatus 40 transmits use-allowance information, which shows that the user can use the information processing apparatus 40, to the user terminal 20.

According to the above-mentioned information processing, for example, even though the information processing apparatus 40A installed at the base A is allowed to be used by only the user terminal 20A installed at the base A, a user B can use the information processing apparatus 40A in a case where the user terminal 20B of the user B of the base B is present in a predetermined range from the information processing apparatus 40A.

Next, deletion processing for requesting the management device 10 to delete identification information, which is instructed to be deleted by the administrator terminal 30, by the information processing apparatus 40 will be described with reference to FIG. 7.

In Step S200, the CPU 31 of the administrator terminal 30 transmits an instruction to delete any identification information from the identification information group of users who can use the information processing apparatus 40, which is stored in the storage 14, to the information processing apparatus 40.

In Step S202, the CPU 41 of the information processing apparatus 40 requests the management device 10 to delete identification information that is instructed to be deleted by the processing of Step S200.

In Step S204, the CPU 11 of the management device 10 deletes the identification information, which is instructed to be deleted by the processing of Step S202, from the storage 14. In addition, the CPU 11 may perform processing so that the identification information deleted in Step S204 cannot be stored in the storage 14 again as the identification information of a user who can use the information processing apparatus 40.

Next, the flow of switching processing for switching whether or not to request the management device 10 to store the identification information by the information processing apparatus 40 will be described with reference to FIG. 8.

Figure 8:
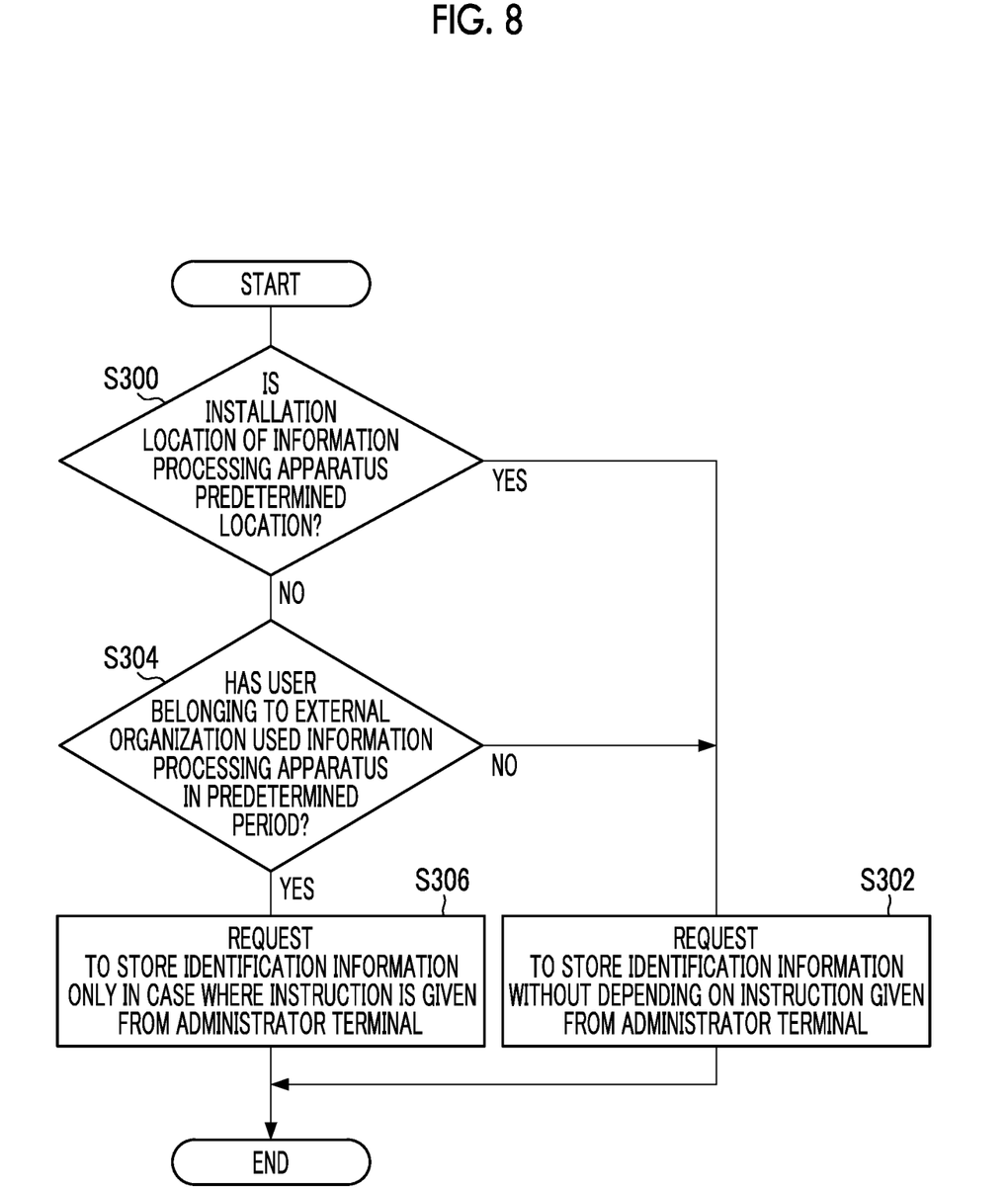
FIG. 8 is a flowchart showing an example of switching processing according to the exemplary embodiment.

In Step S300 of FIG. 8, the CPU 41 of the information processing apparatus 40 reads out the installation location of the information processing apparatus 40 from the storage 44 and determines whether or not the installation location of the information processing apparatus 40 is a predetermined location. In a case where the CPU 41 determines that the installation location of the information processing apparatus 40 is the predetermined location (YES in Step S300), the CPU 41 proceeds to Step S302. On the other hand, in a case where the CPU 41 determines that the installation location of the information processing apparatus 40 is not the predetermined location (NO in Step S300), the CPU 41 proceeds to Step S304. In the present exemplary embodiment, a location where only a person belonging to an organization including the information processing apparatus 40 can visit is applied as the predetermined location. However, the predetermined location is not limited to this example. For example, a location where only a person belonging to an organization including the information processing apparatus 40 and a person allowed by the person belonging to the organization can visit, and the like may be applied as the predetermined location.

In a case where the CPU 41 requests to allow the user terminal 20 to use the information processing apparatus 40 in Step S302, the CPU 41 is set to request the management device 10 to store the received identification information of a user without depending on an instruction given from the administrator terminal 30 and ends this switching processing. In a case where the identification information of a user is stored in the management device 10 without depending on an instruction given from the administrator terminal 30, a burden on an administrator can be reduced.

In Step S304, the CPU 41 reads out the histories of users who have used the information processing apparatus 40 in a predetermined period (for example, the last one week) from the storage 44, and determines whether or not persons not belonging to an organization including the information processing apparatus 40 have used the information processing apparatus 40. In a case where the CPU 41 determines that persons not belonging to the organization including the information processing apparatus 40 have used the information processing apparatus 40 in the predetermined period (YES in Step S304), the CPU 41 proceeds to Step S306. On the other hand, in a case where the CPU 41 determines that persons not belonging to an organization including the information processing apparatus 40 did not use the information processing apparatus 40 in the predetermined period (NO in Step S304), the CPU 41 proceeds to Step S302.

In Step S304, the CPU 41 may determine whether or not a ratio of users who do not belong to the organization including the information processing apparatus 40 among users who have used the information processing apparatus 40 in the predetermined period is equal to or higher than a predetermined ratio (for example, 20%). In this case, in a case where the CPU 41 determines that the ratio of users who do not belong to the organization including the information processing apparatus 40 among users who have used the information processing apparatus 40 is equal to higher than the predetermined ratio, the CPU 41 proceeds to Step S306. On the other hand, in a case where the CPU 41 determines that the ratio of users who do not belong to the organization including the information processing apparatus 40 among users who have used the information processing apparatus 40 is lower than the predetermined ratio, the CPU 41 proceeds to Step S302.

In a case where the CPU 41 requests the management device 10 in Step S306 to allow the user terminal 20 to use the information processing apparatus 40, the CPU 41 is set to request the management device 10 to store the received identification information of a user only in a case where an instruction is given from the administrator terminal 30, and ends this switching processing.

In a case where the CPU 41 requests to allow the user terminal 20 to use the information processing apparatus 40 in Step S306, the CPU 41 may be set not to request the management device 10 to store the received identification information of a user regardless of whether or not there is an instruction given from the administrator terminal 30.

The exemplary embodiments have been described above, but the technical scope of the present invention is not limited to the scope described in the above-mentioned exemplary embodiments. The exemplary embodiments can have various changes or improvements without departing from the scope of the invention, and embodiments including the changes or improvements are also included in the technical scope of the present invention.

Further, the exemplary embodiments do not limit the inventions according to claims, and not all of the combinations of features described in the exemplary embodiments are necessary for means for addressing the problems of the invention. The above-mentioned exemplary embodiments include inventions at various stages, and various inventions are extracted from the combinations of a plurality of disclosed components. As long as effects are obtained even though some components are deleted from all the components disclosed in the exemplary embodiments, configuration from which these some components are deleted may be extracted as an invention.

For example, a case where the information processing system 1 includes the user terminal 20 has been described in the present exemplary embodiment. However, the information processing system 1 may not include the user terminal 20. In this case, for example, in Step S100 of FIGS. 6A and 6B, the CPU 41 of the information processing apparatus 40 may receive identification information and the like by an operation input from a user via a user interface of a display unit, such as a liquid crystal display, included in the information processing apparatus 40. Further, in Step S100 of FIGS. 6A and 6B, the CPU 41 of the information processing apparatus 40 may receive identification information and the like by contact from an integrated circuit (IC) card of a user via an authentication unit or the like included in the information processing apparatus 40. Then, in a case where the CPU 41 receives identification information from a user without using the user terminal 20 and the user is successful in the authentication of the information processing system 1, the CPU 41 does not acquire the position information of the user and may request the management device 10 to allow the user to use the information processing apparatus 40.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

An aspect in which the information processing program is installed in the storage 44 has been described in the present exemplary embodiment, but the present invention is not limited thereto. The information processing program according to the present exemplary embodiment may be provided in a form where the information processing program is recorded on a computer-readable storage medium. For example, the information processing program according to the present exemplary embodiment may be provided in forms where the information processing program is recorded on optical discs, such as a compact disc (CD)-ROM and a digital versatile disc (DVD)-ROM, or forms where the information processing program is recorded on semiconductor memories, such as a universal serial bus (USB) memory and a memory card. Further, the information processing program according to the present exemplary embodiment may be acquired from an external device via the communication I/F 47.

Furthermore, a case where information processing is realized by software configuration using a computer through the execution of a program has been described in the above-mentioned exemplary embodiment, but the present invention is not limited thereto. For example, an aspect in which information processing is realized by hardware configuration or a combination of hardware configuration and software configuration may be provided.

In addition, the configuration of the information processing apparatus 40 described in the above-mentioned exemplary embodiment is an example, and it goes without saying that unnecessary portions may be deleted or new portions may be added without departing from the scope of the present invention.

Further, the flow (see FIGS. 6A and 6B) of the processing of the information processing program described in the above-mentioned exemplary embodiment is an example, and it goes without saying that unnecessary steps may be deleted, new steps may be added, or the order of processing may be changed without departing from the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a hardware processor configured to:
        receive identification information and a request for use of the information processing apparatus from a user terminal of a user;
        transmit the identification information to a management device, wherein the management device authenticates the user;

determine whether the user is successfully authenticated by the management device;

having determining that the user is successfully authenticated by the management device, ask the management device to determine whether the user is allowed to use the information processing apparatus by determining whether the received identification information of the user is included in identification information of a group of users, who are allowed to use the information processing apparatus, stored in the management device;

determine whether the user is allowed to use the information processing apparatus based on a determination result received from the management device;

having determining that the user is not allowed to use the information processing apparatus, acquire position information of the user from the user terminal;

determine whether the user is present in a predetermined range from the information apparatus according to the position information; and having determining that the user is determined present in the predetermined range from the information processing apparatus, request the management device to allow the user to use the information processing apparatus.

2. The information processing apparatus according to claim 1, wherein the hardware processor is further configured to:

request the management device to store identification information of the user together with the above-mentioned request.

3. The information processing apparatus according to claim 2, wherein the hardware processor is configured to:

request the management device to delete the identification information after the hardware processor receives an instruction to delete the identification information stored in the management device from an administrator of the information processing apparatus.

4. The information processing apparatus according to claim 3, wherein the hardware processor is configured to:

determine whether or not to request the management device to store the identification information according to a feature of a user who has used the information processing apparatus in a predetermined period without depending on an instruction given from an administrator of the information processing apparatus.

5. The information processing apparatus according to claim 3, wherein the hardware processor is configured to:

determine whether or not to request the management device to store the identification information according to a feature of the information processing apparatus without depending on an instruction given from an administrator of the information processing apparatus.

6. The information processing apparatus according to claim 5, wherein the feature of the information processing apparatus is an installation location of the information processing apparatus.

7. The information processing apparatus according to claim 5, wherein the hardware processor is configured to:

determine whether or not to request the management device to store the identification information according to a feature of a user who has used the information processing apparatus in a predetermined period without depending on an instruction given from an administrator of the information processing apparatus.

8. The information processing apparatus according to claim 2, wherein the hardware processor is configured to:

determine whether or not to request the management device to store the identification information according to a feature of the information processing apparatus without depending on an instruction given from an administrator of the information processing apparatus.

9. The information processing apparatus according to claim 8, wherein the feature of the information processing apparatus is an installation location of the information processing apparatus.

10. The information processing apparatus according to claim 9, wherein the hardware processor is configured to:

determine whether or not to request the management device to store the identification information according to a feature of a user who has used the information processing apparatus in a predetermined period without depending on an instruction given from an administrator of the information processing apparatus.

11. The information processing apparatus according to claim 8, wherein the hardware processor is configured to:

determine whether or not to request the management device to store the identification information according to a feature of a user who has used the information processing apparatus in a predetermined period without depending on an instruction given from an administrator of the information processing apparatus.

12. The information processing apparatus according to claim 2, wherein the hardware processor is configured to:

determine whether or not to request the management device to store the identification information according to a feature of a user who has used the information processing apparatus in a predetermined period without depending on an instruction given from an administrator of the information processing apparatus.

13. The information processing apparatus according to claim 12, wherein the feature of the user who has used the information processing apparatus in the predetermined period is an organization to which the user belongs.

14. The information processing apparatus according to claim 2, wherein the hardware processor is further configured to:

request the management device to store the identification information after the hardware processor requests the management device to allow the user to use the information processing apparatus and the user satisfies a predetermined condition.

15. The information processing apparatus according to claim 14, wherein the predetermined condition is a condition in which the user belongs to the same organization as an organization including the information processing apparatus.

16. The information processing apparatus according to claim 1, wherein the predetermined range is a range in which the user is capable of communicating with the information processing apparatus through near field communication.

17. The information processing apparatus according to claim 1, wherein the predetermined range is a predetermined range on a network between the information processing apparatus and the user terminal of the user.

18. The information processing apparatus according to claim 1,
wherein the predetermined range is a predetermined physical range between the information processing apparatus and the user terminal of the user.

19. A non-transitory computer readable medium storing an information processing program causing a computer to execute a process comprising:
receiving identification information and a request for use of the information processing apparatus from a user terminal of a user;
transmitting the identification information to a management device, wherein the management device authenticates the user;
determining whether the user is successfully authenticated by the management device;
having determining that the user is successfully authenticated by the management device, asking the management device to determine whether the user is allowed to use the information processing apparatus by determining whether the received identification information of the user is included in identification information of a group of users, who are allowed to use the information processing apparatus, stored in the management device;
determining whether the user is allowed to use the information processing apparatus based on a determination result received from the management device;
having determining that the user is not allowed to use the information processing apparatus, acquiring position information of the user from the user terminal;
determining whether the user is present in a predetermined range from the information apparatus according to the position information; and
having determining that the user is determined present in the predetermined range from the information processing apparatus, requesting the management device to allow the user to use the information processing apparatus.

20. An information processing method comprising:
receiving identification information and a request for use of the information processing apparatus from a user terminal of a user;
transmitting the identification information to a management device, wherein the management device authenticates the user;
determine whether the user is successfully authenticated by the management device;
having determining that the user is successfully authenticated by the management device, asking the management device to determine whether the user is allowed to use the information processing apparatus by determining whether the received identification information of the user is included in identification information of a group of users, who are allowed to use the information processing apparatus, stored in the management device;
determine whether the user is allowed to use the information processing apparatus based on a determination result received from the management device;
having determining that the user is not allowed to use the information processing apparatus, acquiring position information of the user from the user terminal;
determining whether the user is present in a predetermined range from the information apparatus according to the position information; and
having determining that the user is determined present in the predetermined range from the information processing apparatus, requesting the management device to allow the user to use the information processing apparatus.

* * * * *